US005722911A

United States Patent [19]
Ibaraki et al.

[11] Patent Number: 5,722,911
[45] Date of Patent: Mar. 3, 1998

[54] VEHICLE CONTROL APPARATUS ADAPTED TO CHARGE ENERGY STORAGE DEVICE BY GENERATOR DRIVEN BY SURPLUS ENGINE POWER WHICH CHANGES WITH REQUIRED VEHICLE DRIVE FORCE

[75] Inventors: Ryuji Ibaraki, Toyota; Yutaka Taga, Aichi-ken; Seitoku Kubo, Toyota, all of Japan

[73] Assignee: Toyota Jidoshi Kabushiki Kaisha, Toyota, Japan

[21] Appl. No.: 684,692

[22] Filed: Jul. 22, 1996

[30] Foreign Application Priority Data

Jul. 24, 1995 [JP] Japan ................... 7-186853

[51] Int. Cl.$^6$ .............................. B60K 1/02; B60L 11/12
[52] U.S. Cl. .................. 477/3; 477/2; 180/65.3; 180/65.4
[58] Field of Search .................. 477/2, 3, 5, 42, 477/43, 37; 180/65.2, 65.3, 65.4

[56] References Cited

U.S. PATENT DOCUMENTS

| 4,407,132 | 10/1983 | Kawakatsu et al. | |
|---|---|---|---|
| 5,327,992 | 7/1994 | Boll | 180/65.4 X |
| 5,359,308 | 10/1994 | Sun et al. | 180/65.3 X |
| 5,416,702 | 5/1995 | Kitagawa et al. | 180/65.3 X |
| 5,461,289 | 10/1995 | Adler et al. | 180/65.4 X |
| 5,492,189 | 2/1996 | Kriegler et al. | 477/2 X |
| 5,495,912 | 3/1996 | Gray, Jr. et al. | 180/65.4 X |
| 5,547,433 | 8/1996 | Yang | 477/5 |
| 5,549,524 | 8/1996 | Yang | 477/3 |
| 5,562,566 | 10/1996 | Yang | 477/3 |
| 5,582,262 | 12/1996 | Wust | 180/65.4 X |
| 5,586,613 | 12/1996 | Ehsani | 180/65.2 |

FOREIGN PATENT DOCUMENTS

A-6-48222  2/1994  Japan .
A-1-407-951 10/1975 United Kingdom .

OTHER PUBLICATIONS

8049D I.E.E. Proceedings–D/Control Theory & Applications Vol. 134 (1987) Nov., No. 6, Part D, J.R. Bumby et al.: "Optimisation and Control of a Hybrid Electric Car", Great Britain, pp. 373–387.

"Flat Conceptual Approach to Hybrid Cars Design", Ing. Oreste Vittone et al., pp. 458–469, Dec. 5, 1994, vol. 2.

"A Hybrid Drive Based on a Structure Variable Arrangement", International Electric Vehicle Symposium, Anaheim, J. Mayrhofer et al., pp. 189–200, Dec. 5, 1994, vol. 2.

Primary Examiner—Khoi Q. Ta
Assistant Examiner—Peter T. Kwon
Attorney, Agent, or Firm—Oliff & Berridge PLC

[57] ABSTRACT

A drive control apparatus for an automotive vehicle having an electric motor operated by an electric energy generated by an electric generator and stored in an energy storage device, and an engine operated by combustion of a fuel, the apparatus having an electricity generating drive mode in which the vehicle is driven by the engine while the electric generator is operated by the engine to charge the electric energy storage device, wherein a changing control device is operable in the electricity generating drive mode, for controlling the engine to operate in a substantially steady state so as to provide a steady state output, and controlling electric power to be generated by the electric generator such that the electric power corresponds to surplus power of the engine which is equal to a difference between the steady state output of the engine and required vehicle drive power which is currently required to drive the vehicle and which is smaller than the steady state output.

7 Claims, 6 Drawing Sheets

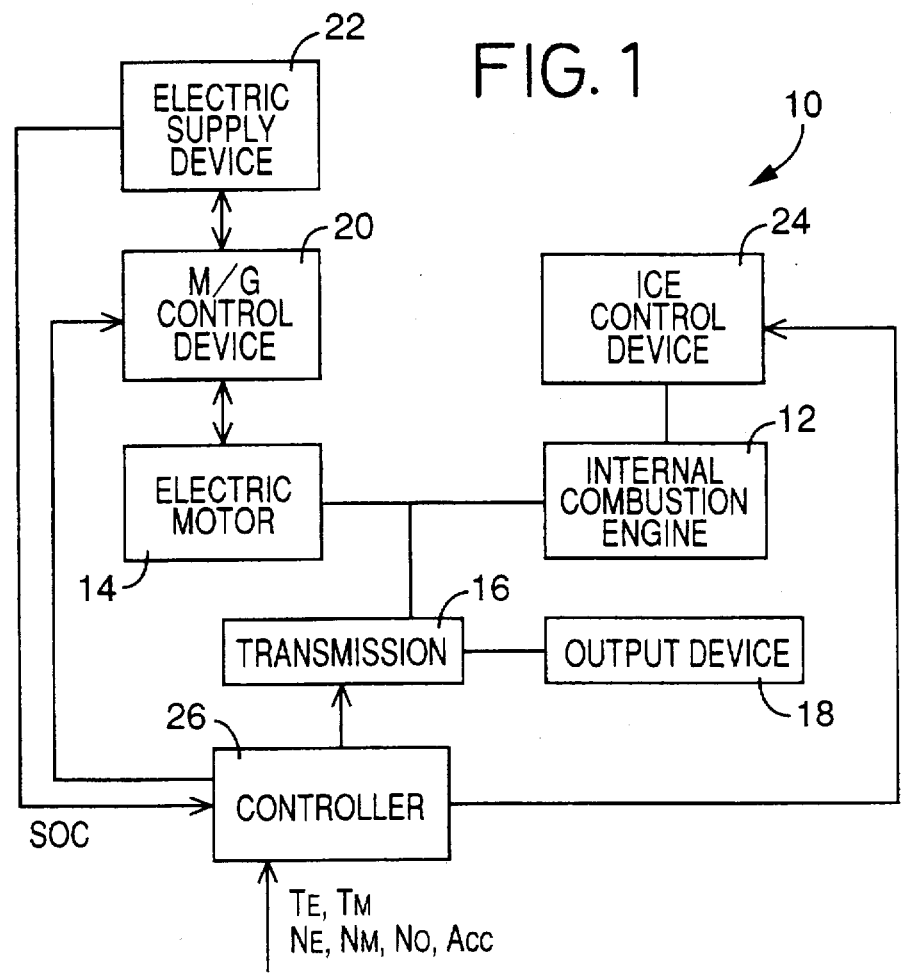
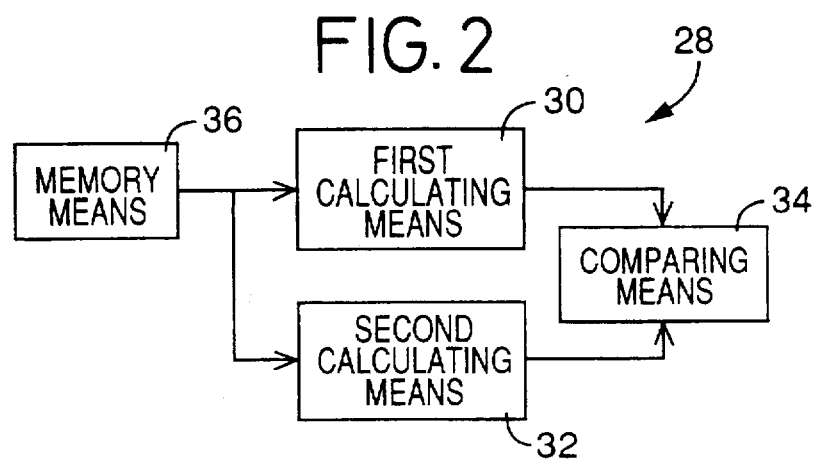

VEHICLE CONTROL APPARATUS ADAPTED TO CHARGE ENERGY STORAGE DEVICE BY GENERATOR DRIVEN BY SURPLUS ENGINE POWER WHICH CHANGES WITH REQUIRED VEHICLE DRIVE FORCE

BACKGROUND OF THE INVENTION

1. Field of the Invention

The present invention relates in general to a drive control apparatus for an automotive vehicle, and more particularly to a drive control apparatus for a so-called "hybrid vehicle" equipped with two drive power sources consisting of an electric motor and an engine such as an internal combustion engine.

2. Discussion of the Related Art

For the purpose of reducing exhaust gas emissions, for example, there has been proposed a so-called "hybrid vehicle" equipped with two drive power sources, which consist of an electric motor operated by an electric energy stored in an electric energy storage device (electric power supply device), and an engine such as an internal combustion engine operated by combustion of a fuel. One type of such hybrid vehicle has an electricity generating drive mode in which an electric generator or dynamo is operated by a surplus torque of the engine during running of the vehicle with the engine selected as the drive power source, so that an electric energy produced by the electric generator is stored in the electric energy storage device. An example of a drive control apparatus for controlling such a hybrid vehicle is disclosed in JP-A-6-48222 (published in 1994), wherein the engine is controlled so as to have an ideal torque value which is calculated to minimize the amount of consumption of the fuel by the engine or the amount of exhaust gases produced by the engine. During running of the vehicle with the engine, a torque value of the engine which is currently required for running the vehicle under the current running condition of the vehicle is calculated. If the ideal torque value is larger than the required torque value, that is, if the engine has a surplus torque (difference between the ideal and required torque values), the vehicle is driven in the electricity generating drive mode, that is, the electric motor is driven by the surplus torque of the engine to charge the electric energy storage device. In the apparatus disclosed in the above-identified publication, the electric motor functions as the electric generator in the electricity generating drive mode.

In the known vehicle drive control apparatus arranged as described above, both the engine and the electric generator should be simultaneously controlled as 3the currently required vehicle drive power as represented by the operating position of the accelerator pedal is changed. On the other hand, the operating condition of the engine varies with a load acting thereon (and acting on the electric generator in the electricity generating drive mode). Further, the engine inevitably has some delay in its response to changes in the fuel injection amount and intake air quantity. Accordingly, the conventional drive control apparatus for a hybrid vehicle suffers from considerable difficulty in suitably controlling the engine and the electric generator with high response to a change in the currently required vehicle drive power.

SUMMARY OF THE INVENTION

It is therefore an object of this invention to provide a drive control apparatus for a hybrid vehicle, which permits easy control of the engine and the electric generator in the electricity generating drive mode in which the electric generator is operated by surplus drive power of the engine to charge the electric energy storage device.

According to the principle of the present invention, there is provided a drive control apparatus for an automotive vehicle having an electric generator for generating an electric energy, an electric energy storage device for storing the electric energy generated by the electric generator, an electric motor operated as a first drive power source by the electric energy, and an engine operated as a second drive power source by combustion of a fuel, the apparatus having an electricity generating drive mode in which the vehicle is driven by operation of the engine while the electric generator is operated by surplus power of the engine to generate electric power corresponding to the surplus power, for charging the electric energy storage device, the surplus power being equal to a difference between an output of the engine and required vehicle drive power which is currently required to drive the vehicle and which is smaller than the output of the engine, wherein an improvement comprises charging control means operable in the electricity generating drive mode, for controlling the engine to operate in a substantially steady state so as to provide a steady state output, and controlling the electric power to be generated by the electric generator, such that the electric power corresponds to surplus power of the engine which is equal to a difference between the steady state output of the engine and the required vehicle drive power smaller than the steady state output, whereby the electric power is changed with a change in the required vehicle drive power.

In the present vehicle drive control apparatus, the electric power to be generated by the electric generator driven by the engine in the electricity generating drive mode is controlled to change in response to a change in the currently required vehicle drive power, so that the engine is held in a substantially steady state irrespective of a change in the required vehicle drive power. Accordingly, the present apparatus does not require the conventionally required difficult control of the engine in response to a change in the required vehicle drive power. Since the engine is held substantially steady in its operating condition irrespective of a change in the currently required vehicle drive power, the deterioration of the exhaust gas emission from the engine in a transient state can be effectively prevented.

In one preferred form of the present vehicle drive control apparatus, the charging control means comprises: (a) engine control means for operating the engine in a substantially steady state; (b) required power calculating means for calculating the required vehicle drive power depending upon a running condition of the vehicle; and (c) generator control means for operating the electric generator to generate the electric power corresponding to the surplus power of the engine equal to the difference between the steady state output and the required vehicle drive power. The engine control means may be adapted to control the engine so as to minimize the fuel consumption rate or exhaust gas emission rate of the engine.

The required vehicle drive power may be changed by operation of the accelerator pedal in response to a change in the road surface gradient, for example. Where the vehicle speed can be held substantially constant by changing the electric power to be generated by the electric generator in response to a change in the required vehicle drive power the engine can be held in a substantially steady state by controlling only the electric power to be generated by the electric generator. Where the vehicle speed varies with a change in the electric power as a result of a change in the required vehicle drive power, however, the operating condition of the engine would vary with a change in its speed would change.

Where the vehicle is equipped with a transmission in a power transmission path between the engine and the electric motor and a drive wheel of the vehicle, the above drawback may be overcome according to another preferred form of the present apparatus, which further comprises transmission control means for controlling a speed ratio of the transmission such that a speed of the engine is held substantially constant irrespective of a change in the required vehicle drive power. In the present preferred form of the invention, the speed ratio of the transmission is suitably controlled by the transmission control means, so as to maintain the engine in a substantially steady state irrespective of a change in the vehicle speed. The transmission is desirably a continuously variable transmission whose speed ratio can be continuously changed. Where the transmission has a plurality of positions having different speed ration values, the operating condition (e.g., speed and torque) of the engine varies with a change in the speed ratio in steps. Even in the presence of this variation, the engine is considered to be in "a substantially steady state" under the control of the charging control means. In this respect, however, the transmission desirably has a relatively large number of positions having different speed rations, in order to reduce the amount of change in the speed ratio for reducing the variation of the operating condition of the engine due to a change in the currently required vehicle drive force.

In a further preferred form of the present invention, the apparatus further comprises drive source selecting means for selecting one of an engine drive mode in which the vehicle is driven by operation of the engine, and a motor drive mode in which the vehicle is driven the electric motor operated by the electric energy stored in the electric energy storage device. The selection of the engine drive mode or the motor drive mode is effected on the basis of a first value in the engine drive mode of a selected physical quantity (e.g., fuel consumption amount or exhaust gas emission amount) relating to a condition of the engine and a second value of the physical quantity reflecting energy conversion efficiencies of the electric generator, the electric motor and the electric energy storage device in the electricity generating mode, and according to a predetermined rule associated with the first and second values.

In one advantageous arrangement of the above preferred form of the apparatus, the drive source selecting means comprises: first calculating means for obtaining the first value of the physical quantity in the engine drive mode; second calculating means for obtaining the second value of the physical quantity which second value reflects the energy conversion efficiencies in the electricity generating drive mode; and comparing means for comparing the first and second values of the physical quantity obtained by the first and second calculating means, and selecting one of the engine drive mode and the motor drive mode depending upon whether one of the first and second values is smaller than the other.

BRIEF DESCRIPTION OF THE DRAWINGS

The above and optional objects, features, advantages and technical and industrial significance of this invention will be better understood by reading the following detailed description of a presently preferred embodiment of the invention, when considered in connection with the accompanying drawings, in which:

FIG. 1 is a block diagram illustrating an arrangement of a vehicle drive control apparatus constructed according to one embodiment of the present invention;

FIG. 2 is a block diagram illustrating the functions achieved by a portion of a controller in the vehicle drive control apparatus of FIG. 1;

DETAILED DESCRIPTION OF THE PREFERRED EMBODIMENT

Figure 3:
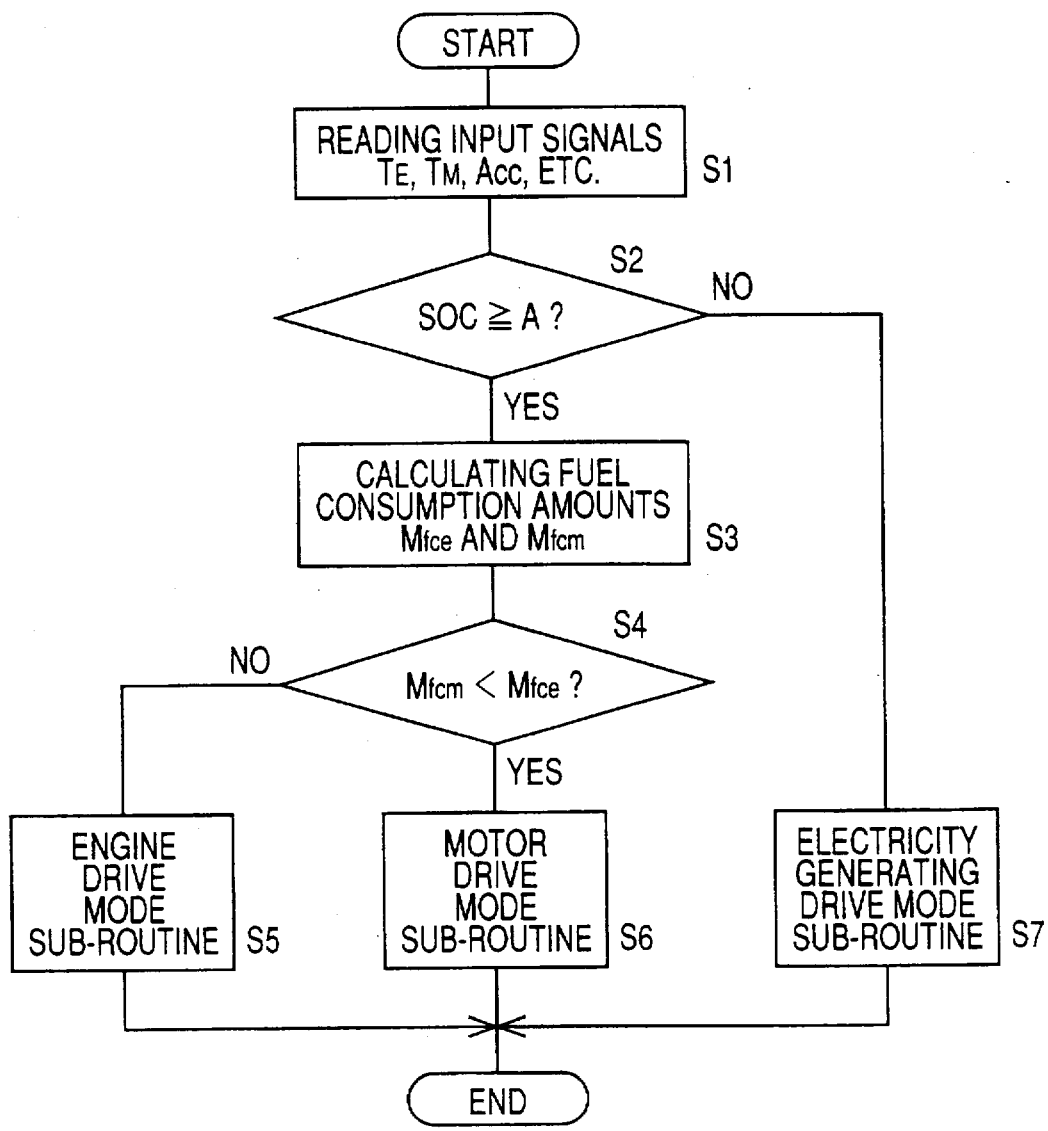
FIG. 3 is a flow chart illustrating a routine executed by the vehicle drive control apparatus of FIG. 1 for running the vehicle in a selected one of three modes.

Referring first to FIG. 1, one embodiment of a vehicle drive control apparatus 10 of the present invention will be described. The apparatus 10 is adapted to control a so-called "hybrid vehicle" which is equipped with two drive sources, one of which is an internal combustion engine 12 such as a gasoline engine operated by combustion of a fuel, and the other of which is an electric motor/dynamo generator 14 functioning as an electric motor and an electric generator (dynamo). Power of the internal combustion engine 12 and power of the motor 14 are simultaneously or selectively transferred to a continuously variable transmission 16, and to right and left drive wheels via an output device 18. The continuously variable transmission 16 may be a belt-drive type or toroidal type transmission capable of continuously changing its speed ratio "i" (input speed/output speed). The output device 18 may include a forward/reverse switching mechanism and a differential gear device. The forward/reverse switching mechanism has a forward drive position for forward running of the vehicle and a reverse drive position for backward running of the vehicle. The motor 14 may be operated in a reverse direction to run the vehicle backward. Suitable clutch or clutches may be disposed between the engine 12 and the motor 14, and/or between these drive source or sources 12, 14 and the continuously variable transmission 16, so that the drive sources 12, 14 and transmission 16 are disconnected from each other as needed.

The motor 14 is connected to an electric energy storage device (electric power supply device) 14 in the form of a battery, for example, through a motor/generator control device (hereinafter abbreviated as "M/G control device) 20 so that the motor 14 is selectively placed in a DRIVE state, a CHARGING state, and a NON-LOAD state. In the DRIVE state, the motor 14 is driven by an electric energy supplied from the electric energy storage device 22. In the CHARGING state, the motor 14 functions as an electric generator or dynamo, with regenerative braking (braking torque electrically generated by the motor 14 itself), for generating an electric energy and storing the generated electric energy in the electric energy storage device 22. In the NON-LOAD state, the output shaft of the motor 14 is permitted to rotate freely. The engine 12 is controlled by an internal combustion engine control device (hereinafter abbreviated as "ICE control device") 24, which includes an actuator for controlling the amount of a fuel injected into the engine 12, an actuator for controlling a throttle valve of the engine 12, an actuator for controlling the ignition timing of the engine 12, and an actuator for controlling suction and exhaust valves of the engine 12. The M/G control device 20 and the ICE control device 24 are controlled by a controller 26.

The controller 26 includes a microcomputer incorporating a central processing unit (CPU), a random-access memory (RAM), and a read-only memory (ROM). The CPU operates according to control programs stored in the ROM while utilizing a temporary data storage function of the RAM. The controller 26 is selectively placed in one of an ENGINE DRIVE mode, a MOTOR DRIVE mode and an ELECTRICITY GENERATING DRIVE mode. In the ENGINE DRIVE mode, the vehicle is driven by the internal combustion engine 12. In the MOTOR DRIVE mode, the vehicle is driven by the electric motor 14. In the ELECTRICITY GENERATING DRIVE mode, the vehicle is driven by the engine 12 while the motor 14 is driven by the engine 12 so as to charge the electric energy storage device 22. The controller 16 is supplied with input signals from various detecting devices. These input signals include signals indicative of a torque $T_E$ of the engine 12, a torque $T_M$ of the motor 14, a speed $N_E$ of the engine 12, a speed $N_M$ of the motor 14, an output speed $N_o$ (corresponding to vehicle running speed V) of the continuously variable transmission 16, an operating amount Acc of an accelerator pedal, and a charging amount SOC of the electric energy storage device 22.

The controller 26 includes drive source selecting means 28 illustrated in the block diagram of FIG. 2. The drive source selecting means 28 selectively establishes the ENGINE DRIVE mode or the MOTOR DRIVE mode. The drive source selecting means 28 includes first calculating means 30 for calculating a fuel consumption amount $M_{fce}$ of the engine 12 in the ENGINE DRIVE mode in which the engine 12 is selected as the drive power source for running the vehicle. This fuel consumption amount $M_{fce}$ is calculated according to the following equation (1):

$$M_{fce} = FCe \times P_L \quad \ldots \quad (1)$$

The drive source selecting means 28 also includes second calculating means 32 for calculating a fuel consumption amount $M_{fcm}$ of the engine 12 in the ELECTRICITY GENERATING DRIVE mode in which the motor 14 is driven by the engine 12 for charging the electric energy storage device 22 with an electric energy necessary to run the vehicle in the MOTOR DRIVE mode (with the motor 14 selected as the drive power source). The calculation of the fuel consumption amount $M_{fcm}$ is calculated according to the following equation (2):

$$M_{fcm} = FCm \times P_L / (\eta_{GEN} \times \eta_{BIN} \times \eta_{BOUT} \times \eta_{MOT}) \quad (2)$$

The drive source selecting means 28 further includes comparing means 34 for comparing the calculated fuel consumption amounts $M_{fce}$ and $M_{fcm}$, for selecting the ENGINE DRIVE mode or the MOTOR DRIVE mode. Described more specifically, the comparing means 34 selects the MOTOR DRIVE mode when the fuel consumption amount $M_{fcm}$ is smaller than the fuel consumption amount $M_{fce}$, and selects the ENGINE DRIVE mode when the fuel consumption amount $M_{fcm}$ is not smaller than the fuel consumption amount $M_{fce}$.

$P_L$ in the above equations (1) and (2) represents instantaneous vehicle drive power required for running the vehicle, which drive power includes components for overcoming an air resistance of the vehicle and a rolling resistance of the tire of each vehicle wheel. The required vehicle drive power $P_L$ may be determined on the basis of the engine speed $N_E$ and torque $T_E$ (or the motor speed $N_M$ and torque $T_M$) and the amount or rate of change of the accelerator pedal operating amount Acc, and according to a predetermined relationship between the required drive power $P_L$ and these parameters. This relationship is represented by a data map stored in memory means 36 also included in the drive source selecting means 28, as indicated in FIG. 2. Other data necessary to calculate the required drive power $P_L$ are also stored in the memory means 36.

Figure 4:
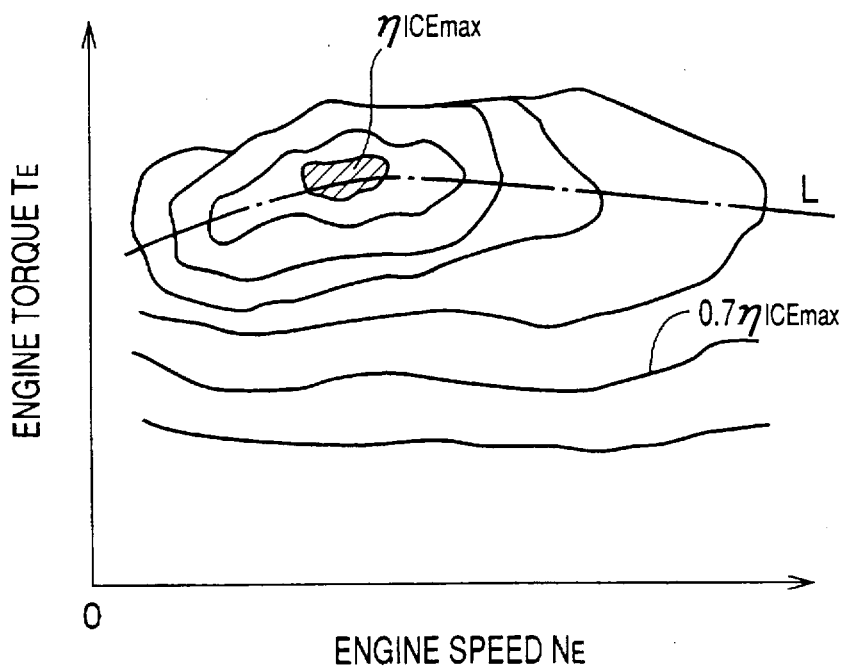
FIG. 4 is graph showing an example of data map indicating the fuel consumption efficiency of an internal combustion engine, which data map is used by the vehicle drive control apparatus of FIG. 1.

FCe represents a fuel consumption rate (g/kWh) of the internal combustion engine 12 when the required drive power $P_L$ is provided by the engine 12. This fuel consumption efficiency FCe may be determined on the basis of the engine torque $T_E$ and speed $N_E$, and according to a predetermined relationship between the efficiency FCe and these parameters, which relationship is represented by a data map also stored in the memory means 36. The graph of FIG. 4 shows iso-fuel consumption rate lines of the engine 12. In the graph, a hatched area indicates the lowest value of the fuel consumption rate FCe at which the power per unit fuel amount is the highest. The fuel consumption rate FCe increases from the hatched area in the outward direction away from the hatched area. Since the required instantaneous drive power $P_L$ is represented by the engine speed $N_E$ and torque $T_E$, the fuel consumption rate FCe may be obtained from the data map of FIG. 4, depending upon the required drive power $P_L$. Data necessary to calculate the fuel consumption rate FCe are also stored in the memory means 36.

$\eta_{CVT}$ represents power transmission efficiency of the continuously variable transmission 16, which may be determined on the basis of the speed ratio "i" (input speed/output speed) and the torque of the transmission 16 and according to a predetermined relationship between the efficiency $\eta_{CVT}$ and the speed ratio and transmission torque, which relationship is represented by a data map or equation also stored in the memory means 36.

$\eta_{ICEmax}$ in FIG. 4 represents a maximum value of the fuel consumption efficiency $\eta_{ICE}$ (reciprocal of the fuel consumption rate FCe). The fuel consumption efficiency $\eta_{ICE}$ decreases from the hatched area in the outward direction away from the hatched area. The fuel consumption efficiency $\eta_{ICE}$ may be set with the maximum value $\eta_{ICEmax}$ being "1".

FCm in the above equation (2) represents the fuel consumption rate of the engine 12 when the motor 14 is driven by the engine 12 in the ELECTRICITY GENERATING DRIVE mode to charge the electric energy storage device 22, while $\eta_{GEN}$, $\eta_{BIN}$, $\eta_{BOUT}$ and $\eta_{MOT}$ represent the following:

$\eta_{GEN}$: electricity generating efficiency, i.e., efficiency of conversion from kinetic energy into electric energy by the motor 14 (functioning as the electric generator)

$\eta_{BIN}$: charging efficiency, i.e., energy conversion efficiency upon charging of the electric energy storage device 22

$\eta_{BOUT}$: discharging efficiency, i.e., energy conversion upon consumption of the electric energy stored in the electric energy storage device 22

$\eta_{MOT}$: motor driving efficiency, i.e., efficiency of conversion from electric energy into kinetic energy by the motor 14

Figure 5:
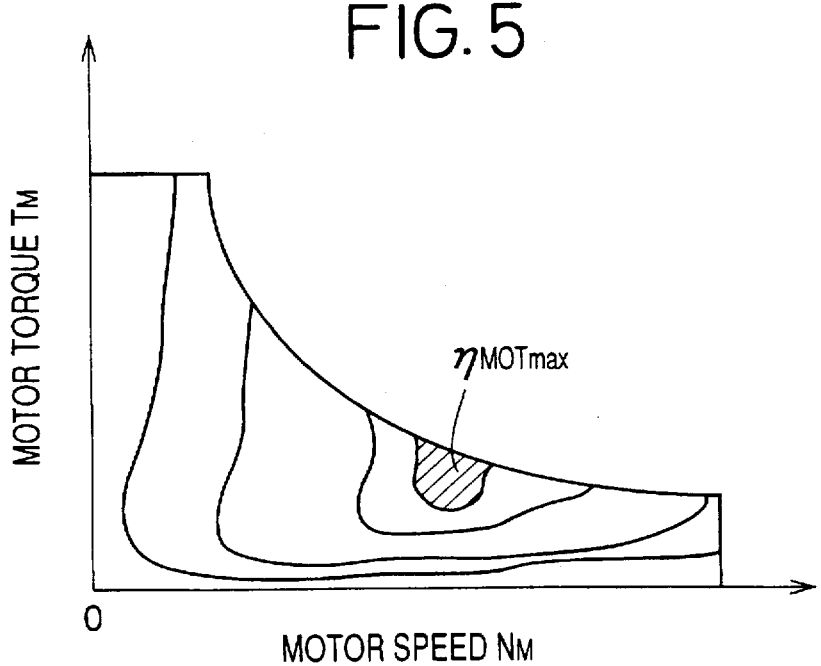
FIG. 5 is a graph showing an example of data map indicating the energy conversion efficiency of an electric motor, which data map is used by the vehicle drive control apparatus of FIG. 1.

The motor driving efficiency $\eta_{MOT}$ may be represented by the motor torque $T_M$ and speed $N_M$, and may be obtained depending upon the operating condition of the motor 14, namely, depending upon the required drive power $P_L$. The graph of FIG. 5 shows iso-motor driving efficiency lines. In the graph, a hatched area in the graph indicates the highest value $\eta_{MOTmax}$ of the motor driving efficiency $\eta_{MOT}$ at which the power per unit electric energy is the highest. The motor driving efficiency $\eta_{MOT}$ decreases from the hatched area in the outward direction away from the hatched area. Since the required drive power $P_L$ is represented by the motor speed $N_M$ and torque $T_M$, the motor driving efficiency $\eta_{MOT}$ may be obtained from the data map of FIG. 5, depending upon the required drive power $P_L$. The discharging efficiency $\eta_{BOUT}$ may be represented by the charging amount SOC of the electric energy storage device 22 and the amount of electric energy to be supplied from the device 22 per unit time (electric power). The signal indicative of the charging amount SOC is received from the device 22, and the amount of electric energy to be supplied per unit time corresponds to the required drive power $P_L$. Therefore, the discharging efficiency $\eta_{BOUT}$ may be obtained on the basis of the charging amount SOC and the required drive power $P_L$ and according to a predetermined relationship between the efficiency $\eta_{BOUT}$ and these values SOC, $P_L$. This relationship is represented by a data map stored in the memory means 36. Other data (such as equations) necessary to calculate the motor driving efficiency $\eta_{MOT}$ and the discharging efficiency $\eta_{BOUT}$ are also stored in the memory means 36.

On the other hand, the fuel consumption rate FCm, electricity generating efficiency $\eta_{GEN}$ and charging efficiency $\eta_{BIN}$ are estimated in the ELECTRICITY GENERATING DRIVE mode in which the motor 14 is driven by the engine 12 to charge the electric energy storage device 22. The thus estimated values FCe, $\eta_{GEN}$ and $\eta_{BIN}$ are independent or irrespective of the current running condition of the vehicle. The ELECTRICITY GENERATING DRIVE mode is selected when the charging amount SOC of the electric energy storage device 22 is smaller than a predetermined threshold value "A", as described below by reference to the flow chart of FIG. 7. To calculate the fuel consumption amount $M_{fcm}$ in step S4 of the routine of FIG. 3, average values (e.g., moving averages) of FCm, $\eta_{GEN}$, $\eta_{BIN}$ in previous vehicle runs in the ELECTRICITY GENERATING DRIVE mode, or values of FCm, $\eta_{GEN}$, $\eta_{BIN}$ in the last vehicle run in the ELECTRICITY GENERATING DRIVE mode are stored in the memory means 36. The fuel consumption amount $M_{fcm}$ is calculated on the basis of those values of FCm, $\eta_{GEN}$, $\eta_{BIN}$ stored in the memory means 36 as well as the currently obtained $\eta_{BOUT}$ and $\eta_{MOT}$. In the ELECTRICITY GENERATING DRIVE mode, the values FCm, $\eta_{GEN}$ and $\eta_{BIN}$ are obtained as described below.

Like the fuel consumption rate FCe, the fuel consumption rate FCm may be obtained on the basis of the engine torque $T_E$ and speed $N_E$ and according to a predetermined relationship between the rate FCm and these values $T_E$, $N_E$, which relationship is indicated in FIG. 4 by way of example and is represented by a stored data map. The electricity generating efficiency $\eta_{GEN}$ may be obtained on the basis of the regenerative braking torque and the motor speed $N_M$ and according to a predetermined relationship between the efficiency $\eta_{GEN}$ and these values, which relationship is represented by a stored data map. The charging efficiency $\eta_{BIN}$ may be obtained on the basis of the charging amount SOC and the amount of electric energy to be stored in the device 22 per unit time (electric power) and according to a predetermined relationship between the efficiency $\eta_{BIN}$ and these values, which relationship is represented by a stored data map. The amount of electric energy to be stored per unit time corresponds to surplus power that is consumed by the engine 12 for the purpose of driving the electric motor 14 for charging the electric energy storage device 22. The data maps and equations necessary for calculating the electric generating efficiency $\eta_{GEN}$ and charging efficiency $\eta_{BIN}$ are stored in the memory means 36.

Referring to the flow chart of FIG. 3, there will be described an operation of the controller 26, by way of example.

The routine of FIG. 3 is executed with a predetermined cycle time, and is initiated with step S1 in which the controller 26 reads input signals indicative of the engine speed $T_E$, motor torque $T_M$, engine speed $N_E$, motor speed $N_M$, transmission output speed $N_O$, charging amount SOC and accelerator pedal operating amount Acc. Step S1 is followed by step S2 to determine whether the charging amount SOC is equal to or larger than the predetermined threshold "A", which is the lower limit of the electric energy stored in the electric energy storage device 22, that is necessary to run the vehicle in the MOTOR DRIVE mode in which the motor 14 is selected as the drive power source. If an affirmative decision (YES) is obtained in step S2, the control flow goes to step S3 and the subsequent steps. If a negative decision (NO) is obtained in step S2, the control flow goes to step S7 in which a sub-routine for running the vehicle in the ELECTRICITY GENERATING DRIVE mode is executed as illustrated in the flow chart of FIG. 4 is executed.

Step S3 is implemented by the first calculating means 30 and the second calculating means 32 of the drive source selecting means 28 illustrated in FIG. 2, for calculating the fuel consumption amounts $M_{fce}$ and $M_{fcm}$, respectively. Step S3 is followed by step S4 which is implemented by the comparing means 34 to determine whether the fuel consumption amount $M_{fcm}$ is smaller than the fuel consumption amount $M_{fce}$. If the fuel consumption amount $M_{fcm}$ is smaller than the fuel consumption amount $M_{fce}$, the control flow goes to step S6 in which a sub-routine for running the vehicle in the MOTOR DRIVE mode is executed. If the fuel consumption amount $M_{fcm}$ is larger than the fuel consumption amount $M_{fce}$, the control flow goes to step S5 in which a sub-routine for running the vehicle in the ENGINE DRIVE mode is executed. The selection of the ENGINE DRIVE mode and the MOTOR DRIVE mode in step S4 permits the vehicle to be run with the minimum fuel consumption $M_{fc}$ of the engine 12. Where the fuel consumption amounts $M_{fcm}$ and $M_{fce}$ are identical with each other, either the ENGINE DRIVE mode or the MOTOR DRIVE mode may be selected. In the present embodiment, however, the ENGINE DRIVE mode is selected.

Figure 6:
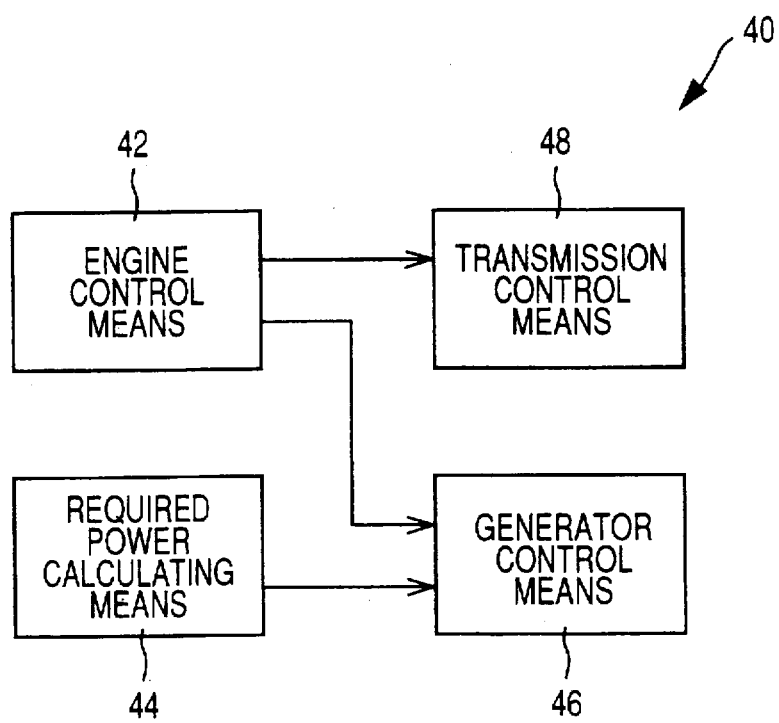
FIG. 6 is a block diagram illustrating the functions of charging control means assigned to execute an ELECTRICITY GENERATING DRIVE mode sub-routine in step S7 of the routine of FIG. 3.

The ELECTRICITY GENERATING DRIVE mode sub-routine in step S7 of the routine of FIG. 3 is executed by charging control means 40 illustrated in FIG. 6. The charging control means 40, which is a part of the drive source selecting means 28 of FIG. 2, includes engine control means 42, required power calculating means, generator control means 46 and transmission control means 48. The engine control means 42 is adapted to control the engine 12 such that the output $P_{ICE}$ of the engine 12 is substantially held constant at a steady state value $P_{ICE}^* = (N_E^*, N_T^*)$. The steady state engine output value $P_{ICE}^*$ is determined to minimize the fuel consumption rate FC, for example. The required power calculating means 44 is adapted to calculate the required vehicle drive power $P_L$ depending upon the running condition of the vehicle, such as the amount and rate of change of the accelerator pedal operating amount Acc. The generator control means 46 is adapted to control the regenerative braking torque of the electric motor 14 (which functions as the electric generator), so that electric power $P_{GEN}$ to be generated by the electric motor 14 as the electric generator corresponds to a surplus drive power ($P_{ICE}*-P_L$), which is the steady state output value $P_{ICE}*$ of the engine 12 minus the required vehicle drive power $P_L$. When the required vehicle drive power $P_L$ is calculated, it is desirable to take into account the power transmission efficiency $\eta_{CVT}$ of the transmission 16. Data necessary to calculate the required vehicle drive power $P_L$ are stored in the memory means 36 of the drive source selecting means 28. The transmission control means 48 is adapted to control the speed ratio "i" of the continuously variable transmission 16 according to the following equation (3) on the basis of the vehicle running speed V, so that the speed $N_E$ of the engine 12 is held at the steady state value $N_E*$ of the steady state engine output $P_{ICE}*$, irrespective of a change in the vehicle speed V.

$$V=(2 \times \pi \times r_D/1000) \times \{60 \times N_E*/(i \times I)\} \quad (3)$$

where,

V: vehicle running speed in km/h $N_E*$: steady state engine speed in r.p.m.

$r_D$: radius of vehicle wheel in meter

I: speed ratio of a portion of the power transmission line other than the transmission 16, which portion includes a final reduction gear, etc.

The ELECTRICITY GENERATING DRIVE mode sub-routine in step S7 of the routine of FIG. 3, which is executed by the charging control means 40, will be described in detail, by reference to the flow chart of FIG. 7.

Figure 7:
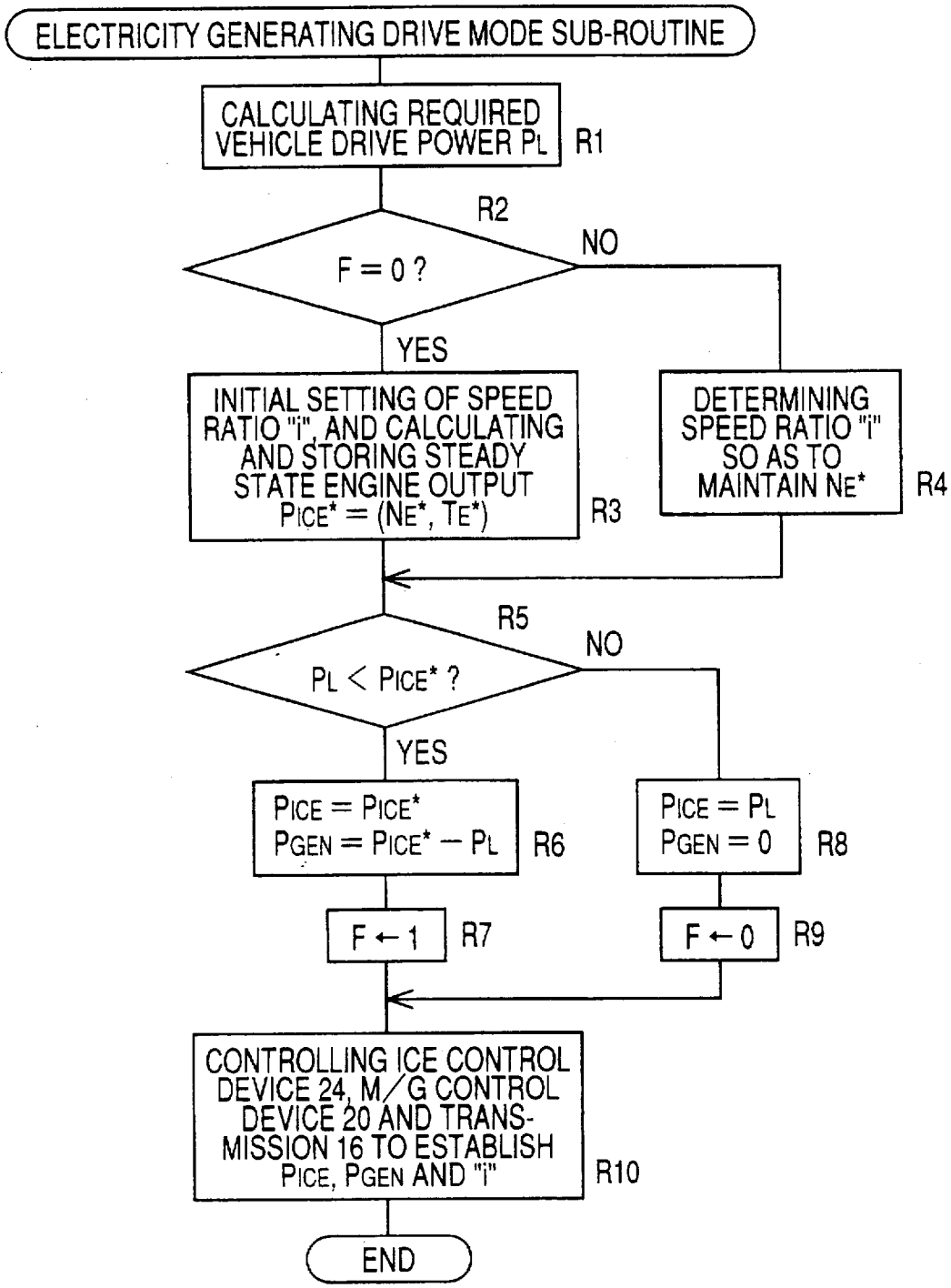
FIG. 7 is a flow chart illustrating the ELECTRICITY GENERATING DRIVE mode sub-routine.

The sub-routine of FIG. 7 is initiated with step R1 in which the currently required vehicle drive power $P_L$ is calculated on the basis of the engine speed $N_E$ and torque $T_E$, or the motor torque $T_E$ and speed $N_E$, and the amount or rate of change of the operating amount Acc of the accelerator pedal. Step R1 is followed by step R2 to determine whether a flag F is set at "0". If an affirmative decision (YES) is obtained, the control flow goes to step R3. Since the flag F is set to "0" upon initialization of the charging control means 40, step R3 and the following steps are implemented when the sub-routine of FIG. 7 is executed for the first time. In step R3, the speed ratio "i" of the transmission 16 is set at a predetermined initial value, and the steady state engine output $P_{ICE}*=(N_E*, T_E*)$ is calculated and stored in the memory means 36. The initial value of the speed ratio "i" is determined depending upon the running condition of the vehicle such as the currently required vehicle drive power $P_L$, in relation to the steady state engine output value $P_{ICE}*$. To obtain the steady state engine output value $P_{ICE}*$, the steady state engine speed $N_E*$ is first calculated on the basis of the speed ratio "i" and the vehicle speed V and according to the above equation (3). Then, the steady state engine torque $T_E*$ is calculated according to a minimum fuel consumption rate line L indicated by one-dot chain line in FIG. 4, for example, so that the fuel consumption rate FC at the calculated steady state engine speed $N_E*$ is minimized. The line L may be represented by a data map stored in the memory means 36. However, the steady state engine output $P_{ICE}*$ may be obtained otherwise. For example, the electricity generating efficiency $\eta_{GEN}$ of the electric motor 14 and the charging efficiency $\eta_{BIN}$ of the electric energy storage device 22 may be taken into account in determining the steady state engine output $P_{ICE}*$, so as to maximize the ratio of the charging amount of the device 22 to the fuel consumption amount of the engine 12. Further, the initial value of the speed ratio "i" of the transmission 16 may be determined so that the steady state engine output $P_{ICE}*$ is held within a range of the maximum or highest fuel consumption efficiency $\eta_{ICEmax}$ indicated by the hatched area in FIG. 4. However, the steady state engine output $P_{ICE}*=(N_E*, T_E*)$ may be predetermined fixed value.

Step R3 is followed by step R5 to determine whether the steady state engine output $P_{ICE}*$ calculated in step R3 is larger than the required vehicle drive power $P_L$. If an affirmative decision (YES) is obtained in step R5, the control flow goes to step R6 to set the engine output $P_{ICE}$ to be equal to the steady state value $P_{ICE}*$, and set the electric power $P_{GEN}$ (to be generated by the motor 14) to be equal to a steady state surplus drive power ($P_{ICE}*-PL$). Then, the control flow goes to step R7 to set the flag F to "1). Step R7 is followed by step R10 to control the ICE control device 24 for operating the engine 12 so that the actual engine output $P_{ICE}$ coincides with the steady state value $P_{ICE}*$, control the M/G control device 20 for controlling the electric motor 14 so that the electric power $P_{GEN}$ generated by the motor 14 coincides with the steady state surplus drive power ($P_{ICE}*-P_L$), and control the continuously variable transmission 16 to operate at the speed ratio "i". If a negative decision (NO) is obtained in step R5, namely, if the steady state engine output $P_{ICE}*$ is equal to or smaller than the required vehicle drive power $P_L$, the control flow goes to step R8 to set the engine output $P_{ICE}$ to be equal to the required vehicle drive power $P_L$, and set the electric power $P_{GEN}$ to "0". Step R8 is followed by step R9 to reset the flag F to "0". In this case, the ICE control device 24 and the M/G control device 20 are controlled in step R10 so that the actual engine output $P_{ICE}$ coincides with the required drive power $P_L$ and so that the electric power $P_{GEN}$ generated by the electric motor 14 is zero with the motor 14 placed in its NON-LOAD state. Further, the transmission 16 is controlled to establish the speed ratio "i".

After the flag F has been set to "1" in step R7 as a result of the affirmative decision (YES) obtained in step R5 with the steady state engine output $P_{ICE}*$ being larger than the required vehicle drive power $P_L$, a negative decision (NO) is obtained in step R2 in the next cycle of execution of the sub-routine of FIG. 7. In this case, step R4 is implemented to determine the speed ratio "i" of the transmission 16 according to the above equation (3) so that the actual engine speed $N_E$ is maintained at the steady state engine speed $N_E*$ of the steady state engine output $P_{ICE}*$ is maintained irrespective of a change in the vehicle running speed V. Then, the control flow goes to step R5 and the subsequent steps. If the affirmative decision (YES) is obtained in step R5, the ICE control device 24, M/G control device 20 and transmission 16 are controlled in step R10 such that the engine 12 provides the steady state output $P_{ICE}*$ determined in step R3, and so that the electric power $P_{GEN}$ generated by the electric motor 14 corresponds to the surplus drive power ($P_{ICE}*-P_L$), while the transmission 16 is operated at the speed ratio "i" which has been set in step R4.

Steps R3, R6 and R10 of the sub-routine of FIG. 7 for controlling the output $P_{ICE}$ of the engine 12 to be maintained at the steady state value $P_{ICE}*$ are implemented by the engine control means 42, while step R1 to calculate the currently required vehicle drive power $P_L$ is implemented by the required power calculating means 44. Further, steps R6 and R10 for controlling the electric motor 14 as the electric generator so that the generated electric power $P_{GEN}$ corresponds to the steady state surplus drive power ($P_{ICE}^*-P_L$) are implemented by the generator control means 46, and steps R4 and R10 for controlling the transmission 16 so as to maintain the engine speed $N_E$ at the steady state value $N_E^*$ is implemented by the transmission control means 48.

In the ELECTRICITY GENERATING DRIVE mode of the present vehicle drive control apparatus 10, the vehicle is driven by the engine 12 as the drive power source while at the same time the electric motor 14 is driven by the engine 12, more specifically, by the surplus drive power ($P_{ICE}^*-P_L$) which is the steady state engine output $P_{ICE}^*$ minus the currently required vehicle drive power $P_L$, so that the electric energy storage device 22 is charged with the electric energy generated by the electric motor 12. In this ELECTRICITY GENERATING DRIVE mode, the engine 12 is operated such that the actual engine output $P_{ICE}$ is held at the steady state value $P_{ICE}^*$, and the electric power $P_{GEN}$ to be generated by the electric motor 14 is changed with a change in the currently required vehicle drive power $P_L$, while the engine output $P_{ICE}$ is held constant at the steady state value $P_{ICE}^*$. This arrangement makes it easier to control the operating conditions of the engine 12 and the electric motor 14 in the ELECTRICITY GENERATING DRIVE mode, than the conventional arrangement in which the operating conditions of the engine and electric motor are both changed in response to a change in the currently required vehicle drive power $P_L$. In this respect, particular attention is directed to the aspect of the present control arrangement that the engine 12 is kept operated with its output held substantially constant at the steady state value $P_{ICE}^*$, in view of the general general tendency that an internal combustion engine has a comparatively large number of parameters to be controlled and suffers from some degree of delay in its operating response. Thus, the present charging means 40 operated in the ELECTRICITY GENERATING DRIVE mode permits considerably increase ease and stability in controlling the engine 12 and the electric motor 14 during running of the vehicle with the engine 12 while operating the electric motor 14 to charge the electric energy storage device 22, and assures improved running stability and driving comfort of the vehicle in the ELECTRICITY GENERATING DRIVE mode. Since the output $P_{ICE}$ of the engine 12 is held substantially constant irrespective of a change in the required vehicle drive power in the present mode, otherwise possible deterioration of the exhaust gas emissions of the engine 12 in a transient state thereof can be suitably prevented.

Further, the speed ration "i" of the continuously variable transmission 16 is controlled so that the actual speed $N_E$ of the engine 12 is maintained at the steady state value $N_E^*$ irrespective of a change in the vehicle running speed V. Accordingly, the engine 12 is held in a substantially steady state under various operating conditions of the vehicle at the vehicle speed V varying with the currently required vehicle drive power $P_L$, in the ELECTRICITY GENERATING DRIVE mode. Described more particularly, the required vehicle drive power $P_L$ may be changed by operation of the accelerator pedal in response to a change in the road surface gradient, for example. Where the vehicle speed V can be held substantially constant by changing the electric power $P_{GEN}$ of the electric motor 14 with a change in the required vehicle drive power $P_L$, the engine 12 can be held in a substantially steady state by controlling only the electric power $P_{GEN}$. Where the vehicle speed V varies with a change in the electric power $P_{GEN}$ as a result of a change in the required vehicle drive power $P_L$, the operating condition of the engine 12 would vary with a change in its speed $N_E$ would change if the speed ratio "i" of the transmission 16 was not controlled in response to a change in the vehicle speed V. In the present embodiment, the speed ratio "i" of the transmission 16 is suitably controlled so as to maintain the engine speed $N_E$ at the steady state value $N_E^*$ irrespective of a change in the vehicle speed V. Since the speed ration "i" of the transmission 16 can be changed continuously, the engine speed $N_E$ can be held steady at $N_E^*$. It is also noted that it is considerably easier to control the speed ratio "i" of the transmission 16 than to control the engine 12.

Figure 8:
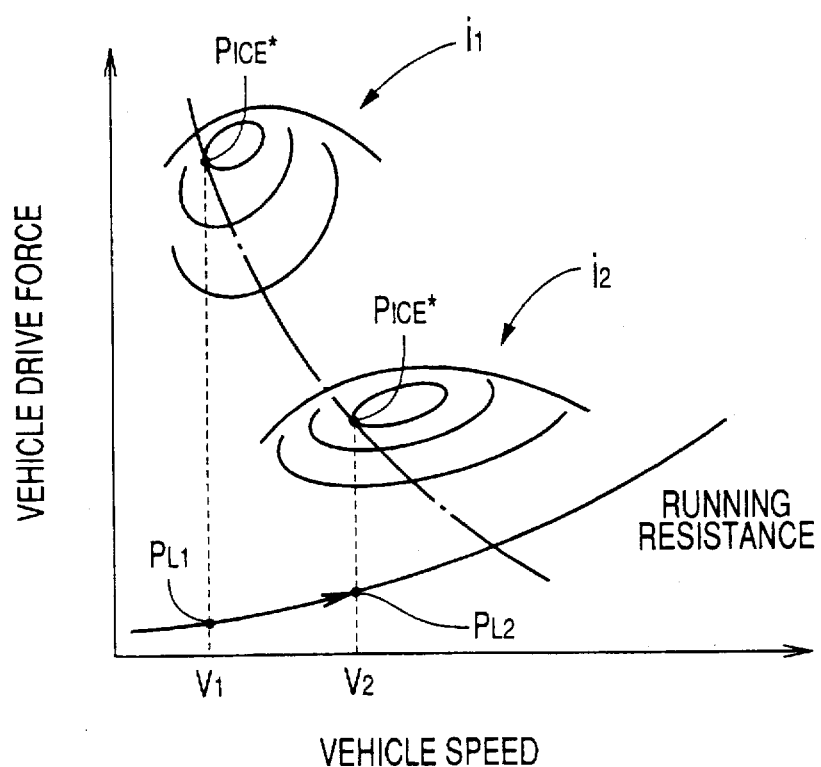
FIG. 8 is a graph showing an example of changes of currently required vehicle drive power, vehicle speed and transmission speed ratio when the engine, electric motor and continuously variable transmission are controlled in the ELECTRICITY GENERATING drive mode of FIG. 7.

Referring to the graph of FIG. 8, there is shown an example of changes of the required vehicle drive power $P_L$ and the speed ratio "i" of the transmission 16 with a change in the vehicle speed V, under the control of the present apparatus 10 placed in the ELECTRICITY GENERATING DRIVE mode. In the example, the vehicle running condition changes from a first state in which the parameters $P_L$, V and "i" are equal to $P_{L1}$, V1 and i1, respectively, to a second state in which the parameters $P_L$, V and "i" are equal to $P_{L2}$, V2 and i2, respectively. In the first state, the electric power $P_{GEN}$ is equal to ($P_{ICE}^*-P_{L1}$). As a result of a change of the required vehicle drive power $P_L$ from $P_{L1}$ to $P_{L2}$, the electric power $P_{GEN}$ is changed to ($P_{ICE}^*-P_{L2}$) in the second state, whereby the vehicle drive force equal to the value $P_{L2}$ is obtained with the engine 12 operating with its output $P_{ICE}$ held constant at the steady state value $P_{ICE}^*$. Further, as a result of a change of the vehicle speed V from V1 to V2, the speed ratio "i" of the transmission 16 is changed from i1 to i2, so that the engine speed $N_E$ is held constant at $N_E^*$ with high accuracy irrespective of a change in the vehicle speed. Thus, the output of the engine 12 is held constant at the steady state value $P_{ICE}^* \doteq (N_E^*, T_E^*)$ irrespective of changes of the required vehicle drive power $P_L$ and vehicle speed V. In FIG. 8, two sets of ellipses at two positions represent two sets of iso-fuel consumption rate lines of the engine 12 corresponding to the speed ratios i1 and i2.

While the presently preferred embodiment of this invention has been described in detail by reference to the accompanying drawings, it is to be understood that the present invention may be otherwise embodied.

In the illustrated embodiment, the ENGINE DRIVE mode or the MOTOR DRIVE mode is selected so as to reduce the fuel consumption amount Mfc, whereby the fuel consumption amount Mfc is minimized and the exhaust gas emission amount is accordingly minimized. However, the exhaust gas emission amount of the engine 12 can be further reduced by replacing the fuel consumption rates Fcm, Fce in the above equations (1) and (2), by an exhaust gas emission rate (amount of the exhaust gas emission per unit power).

In the illustrated, the fuel consumption amounts $M_{fcm}$, $M_{fce}$ are calculated in each cycle of execution of the routine of FIG. 3 depending upon the running condition of the vehicle such as the required drive power $P_L$. In this connection, it is noted that the maximum energy conversion efficiencies $\eta_{GEN}$ and $\eta_{MOT}$ ($\eta_{MOTmax}$ indicated in FIG. 5) of the motor 14 are about 92%, while the input and output efficiency $\eta_{BIN} \times \eta_{BOUT}$ of the electric energy storage device 22 is about 85%, whereby the overall energy conversion efficiency of the electric control system is about $0.72 \doteq 0.92 \times 0.85 \times 0.92$. In view of this fact, it is possible to select the ENGINE DRIVE mode if the fuel consumption efficiency $\eta_{ICE}$ for running the vehicle in the ENGINE DRIVE mode with the engine 12 selected as the drive power source is larger than a threshold $0.7\eta_{ICEmax}$ indicated in FIG. 4, which threshold is 70% of the maximum fuel consumption efficiency $\eta_{ICEmax}$, and select the MOTOR DRIVE mode if the fuel consumption efficiency $\eta_{ICE}$ is smaller than the threshold $0.7\eta_{ICEmax}$. This modified arrangement facilitates the selection of the ENGINE DRIVE mode and the MOTOR DRIVE mode, by simply obtaining the fuel consumption efficiency $\eta_{ICEmax}$ in the ENGINE DRIVE mode. The threshold is not limited to 70% of the maximum fuel consumption efficiency $\eta_{ICEmax}$, but may be suitably determined depending upon the energy conversion efficiencies of the motor 14 and the electric energy storage device 22. Where these energy conversion energy efficiencies varies to a comparatively large extent, it is desirable to select the ENGINE DRIVE mode if the fuel consumption efficiency $\eta_{ICE}$ in the ENGINE DRIVE mode is larger than the threshold, and select the ENGINE DRIVE mode or the MOTOR DRIVE mode by implementing steps S3–S6 of FIG. 3 if the fuel consumption efficiency $\eta_{ICE}$ is smaller than the threshold. Similar modification is possible where the exhaust gas amount is reduced by replacing the fuel consumption efficiency $\eta_{ICE}$ by the exhaust gas emission efficiency.

Although the illustrated embodiment is adapted to select one of the ENGINE DRIVE, MOTOR DRIVE and ELECTRICITY GENERATING DRIVE modes, the modes available in the first embodiment may be suitably changed. For instance, the illustrated embodiment may be modified to have an ENGINE.MOTOR DRIVE mode in which the vehicle is driven by simultaneous operations of the engine 12 and the motor 14 and which is selected when the vehicle load is comparatively high.

While the drive control apparatus 10 according to the illustrated embodiment is provided for a hybrid vehicle having only one electric motor 14, the principle of the present invention is equally applicable various types of hybrid vehicles, for example, a hybrid vehicle having two or more electric motors for respective drive wheels.

It is to be understood that the present invention may be embodied with various other changes, modifications and improvements, which may occur to those skilled in the art, in the light of the foregoing teachings.

What is claimed is:

1. A drive control apparatus for an automotive vehicle having an electric generator for generating an electric energy, an electric energy storage device for storing the electric energy generated by said electric generator, an electric motor operated as a first drive power source by said electric energy, and an engine operated as a second drive power source by combustion of a fuel, said apparatus having an electricity generating drive mode in which the vehicle is driven by operation of said engine while said electric generator is operated by surplus power of said engine to generate electric power corresponding to said surplus power, for charging said electric energy storage device, said surplus power being equal to a difference between an output of the engine and required vehicle drive power which is currently required to drive the vehicle and which is smaller than said output of the engine, wherein an improvement comprises charging control means operable in said electricity generating drive mode, for controlling said engine to operate in a substantially steady state so as to provide a steady state output, and controlling said electric power to be generated by said electric generator, such that said electric power corresponds to surplus power of the engine which is equal to a difference between said steady state output of the engine and said required vehicle drive power smaller than said steady state output, whereby said electric power is changed with a change is said required vehicle drive power; and further comprising:

an engine drive mode in which the vehicle is driven by operation of said engine;

a motor drive mode in which the vehicle is driven by the electric motor operated by the electric energy stored in the electric energy storage device; and drive source selecting means for selecting one of said engine drive mode and said motor drive mode, wherein said drive source selecting means selects a drive source on the basis of a first value in said engine drive mode of a physical quantity relating to a condition of said engine and a second value of said physical quantity reflecting energy conversion efficiencies of said electric generator, said electric motor and said electric energy storage device in said electricity generating mode, and according to a predetermined rule associated with said first and second values.

2. A drive control apparatus according to claim 1, wherein said charging control means comprises:

engine control means for operating said engine in a substantially steady state;

required power calculating means for calculating said required vehicle drive power depending upon a running condition of the vehicle; and generator control means for operating said electric generator to generate the electric power corresponding to said surplus power of the engine equal to said difference between said steady state output and said required vehicle drive power.

3. A drive control apparatus according to claim 2, wherein said vehicle further has a transmission provided in a power transmission path between said engine and said electric motor and a drive wheel of the vehicle, said charging control means further comprising transmission control means for controlling a speed ratio of said transmission such that a speed of said engine is held substantially constant irrespective of a change in said required vehicle drive power.

4. A drive control apparatus according to claim 3, wherein said transmission is a continuously variable transmission.

5. A drive control apparatus according to claim 1, wherein said electric motor also functions as said electric generator.

6. A drive control apparatus according to claim 1, wherein said physical quantity consists of an amount of consumption of said fuel by said engine.

7. A drive control apparatus according to claim 1, wherein said drive source selecting means comprises:

first calculating means for obtaining said first value of said physical quantity in said engine drive mode;

second calculating means for obtaining said second value of said physical quantity which second value reflects the energy conversion efficiencies in said electricity generating drive mode; and comparing means for comparing said first and second values of said physical quantity obtained by said first and second calculating means, and selecting one of said engine drive mode and said motor drive mode depending upon whether one of said first and second values is smaller than the other.

* * * * *

UNITED STATES PATENT AND TRADEMARK OFFICE
CERTIFICATE OF CORRECTION

PATENT NO. : 5,722,911
DATED : March 3, 1998
INVENTOR(S) : Ryuji IBARAKI ET AL.

It is certified that error appears in the above-indentified patent and that said Letters Patent is hereby corrected as shown below:

On the title page: Item [73]:

Change "Jidoshi" to --Jidosha--.

Signed and Sealed this

Eighth Day of September, 1998

Attest:

BRUCE LEHMAN

Attesting Officer

Commissioner of Patents and Trademarks